United States Patent
Lees

[15] 3,658,624
[45] Apr. 25, 1972

[54] BONDING METHOD EMPLOYING A TWO PART ANAEROBICALLY CURING ADHESIVE COMPOSITION

[72] Inventor: William Arthur Lees, Chandlers Ford, England

[73] Assignee: Borden Inc., New York, N.Y.

[22] Filed: Sept. 29, 1969

[21] Appl. No.: 862,065

[52] U.S. Cl. ............................156/332, 156/294, 156/310, 156/315
[51] Int. Cl. ...........................................C09j 5/00
[58] Field of Search ..........................156/310, 315, 332, 294

[56] References Cited

UNITED STATES PATENTS

| | | | |
|---|---|---|---|
| 2,894,932 | 7/1959 | Bader et al. | 156/332 X |
| 2,895,950 | 7/1959 | Krieble | 156/332 X |
| 3,041,322 | 6/1962 | Krieble | 156/332 X |
| 3,046,262 | 7/1962 | Krieble | 156/332 X |
| 3,125,480 | 3/1964 | Karo et al. | 156/310 |
| 3,180,777 | 4/1965 | Karo | 156/310 |
| 3,218,305 | 11/1965 | Krieble | 156/332 X |
| 3,419,512 | 12/1968 | Lees et al. | 156/332 X |
| 3,435,012 | 3/1969 | Nordlander | 156/332 X |
| 3,479,246 | 11/1969 | Stapleton | 156/332 X |

Primary Examiner—Carl D. Quarforth
Assistant Examiner—R. L. Tate
Attorney—George P. Maskas and Edward L. Mandell

[57] ABSTRACT

A method for producing a rapid and effective bond between two surfaces which comprises applying to a first surface to be bonded a composition which is stable for an extended period in the presence of oxygen and comprises a major proportion of a monomer having anaerobic curing properties and a minor proportion of a first accelerator moiety, separately applying to a second surface to be bonded, or to the first surface immediately before bonding, a second composition, also stable for an extended period in the presence of oxygen and comprising a major proportion of a monomer having anaerobic curing properties and a minor proportion of a second accelerator moiety complementary to the first and bringing the first and second surfaces together to allow the said compositions to combine anaerobically, the accelerator moieties in the compositions being so chosen that they act synergistically when combined.

13 Claims, No Drawings

BONDING METHOD EMPLOYING A TWO PART ANAEROBICALLY CURING ADHESIVE COMPOSITION

BACKGROUND OF THE INVENTION

This invention relates to compositions having adhesive and/or sealant properties and, more particularly, to compositions curing rapidly under anaerobic conditions, in the presence or absence of catalytic metal surfaces. Such compositions find application in the locking of threads in bolted assemblies and in related uses, such as the cementing into position of bushes or other housings and the production of fluid-tight seals between surfaces.

It has previously been proposed to employ compositions having anaerobic curing properties, that is, compositions having the property of remaining liquid for extended periods in the presence of air or oxygen and of polymerizing rapidly in the absence of oxygen and in the presence of a catalytic metal. Compositions of this type are disclosed, for example, in British Pat. Nos. 1,090,753; 1,067,433 and 1,094,853 and commonly comprise an acrylic monomer, a peroxide or hydroperoxide, and an amine. When employed on catalytic metal surfaces, for example, as locking sealants for steel nuts, the compositions of the prior art have proved to be generally satisfactory. When used on non-catalytic surfaces, however, for example on non-metals or on metals such as cadmium, the known compositions commonly fail to polymerize or do so at an industrially inadequate rate, even when oxygen is excluded.

It has, therefore, been proposed to pre-treat non-catalytic surfaces with a coating of a catalytic salt solution as a means of overcoming this disadvantage. Typically, iron, cobalt or copper driers, such as their resinates, are used for this purpose in the form of solutions in organic solvents. This procedure has, however, a number of disadvantages. For example, the coating of metal salts forms a plane of weakness at the surface of the object coated which reduces the bond-strength obtainable, often in an erratic and unpredictable manner. Solvents are normally required as carriers for the metal salts and these introduce danger of fire or toxicity. In addition, before the treated parts can be assembled the solvent must be allowed to evaporate, so that production delays may ensue. There is, moreover, a danger that components may be assembled before the solvent has evaporated and occasion poor bonds in consequence. Also because the salts are present only as a surface film, polymerization will only be initiated at the interface. In consequence, their effect is frequently delayed, particularly where the adhesive is present as a thick layer. Another major difficulty associated with the use of metal salts as accelerators is that they increase the electrical conductivity of the system. This defect is particularly undesirable when the compositions are employed in bonding non-conductors in electrical equipment.

DETAILED DESCRIPTION OF THE INVENTION

We have now found that components, whether of materials having a catalytic effect on the polymerization reaction or not, may be rapidly and effectively bonded by a method which comprises applying to a first surface to be bonded a composition which is stable for an extended period in the presence of oxygen and comprises a major proportion of a monomer having anaerobic curing properties and a minor proportion of a first accelerator moiety, separately applying to a second surface to be bonded, or to the first surface immediately before bonding, a second composition, also stable for an extended period in the presence of oxygen and comprising a major proportion of a monomer having anaerobic curing properties and a minor proportion of a second accelerator moiety complementary to the first and bringing the first and second surfaces together to allow the said compositions to combine anaerobically, the accelerator moieties in the compositions being so chosen that they act synergistically when combined.

Monomers which are suitable for the purpose of the present invention are those which conform to the general formula:

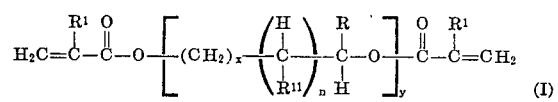

(I)

wherein

R is $-H, -CH_3, -C_2H_5, -CH_2-OH$, or

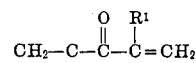

$R^1$ is $-H, -Cl, -CH_3$, or $-C_2H_5$ $R^{11}$ is $-H, -OH$, or

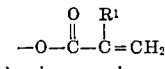

$x$ and $y$ are integers having a value of from 1 to 4 and $n$ is 0 or 1.

The preferred monomer falling within the general formula (I) is tetraethylene glycol dimethacrylate. Illustrative of other monomers suitable in the practice of the present invention and falling within the general formula (I) are hexamethyleneglycol dimethacrylate and those exemplified in British Pat. No. 1,090,753, for example diethylene glycol diacrylate, diethylene glycol dimethacrylate, triethylene glycol dimethacrylate, tetraethylene glycol diacrylate, dipropylene glycol dimethacrylate, diglycerol dimethacrylate, diglycerol tetramethacrylate and di( pentamethylene )glycol diacrylate.

Other monomers which are suitable for the purpose of the present invention are those which conform to the general formula:

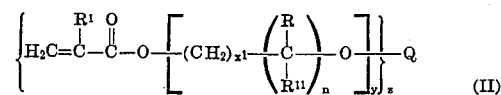

(II)

wherein $R^1, R^{11}, n$ and $y$ have the same meaning as defined for formula (I), $x'$ is zero or an integer having a value of from 1 to 4

$z$ is 1, 2, 3 or 4 and

Q is an organic radical having a valene of $z$ and is a hydrocarbon residue consisting of one to eight carbon atoms, preferably lower alkyl. Illustrative of monomers falling within formula (II) are the monoacrylate ester of dimethyleneglycol monomethylether and pentaerythrityl tetrakis (dimethyleneglycol acrylate).

Further monomers which are suitable for the purpose of the present invention are those which conform to the general formula:

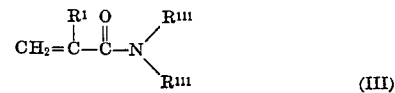

(III)

wherein $R^1$ has the same meaning as defined for formula (I) and $R^{111}$ is $-H, -CH_3$ or $-C_2H_5$.

A preferred example of a monomer falling within formula (III) is N-methyl methacrylamide.

It is not necessary that the same monomer by employed on all of the surfaces to be bonded and mixtures of monomers may be used if desired.

The term "accelerator moiety" as employed herein means a component which, when added to the monomer in the proportions used, has insufficient accelerating action markedly to impair the storage life of the monomer, but which, when combined with a second component similarly defined and referred to herein as a "complementary accelerator moiety," will act synergistically with it to effect rapid polymerization of the monomer under anaerobic conditions. Typically, the accelerator moiety employed in one portion of the monomer is an amine while the complementary accelerator moiety is a sulphimide. Illustrative of the suitable amines are the tertiary amines such as N,N - dimethyl-p-toluidine. The complementary accelerator moiety is a sulphimide, illustrative of which is saccharin (2, 3 - benzisothiazolinone - 1, 1- dioxide). Other tertiary amines may, however, be employed in place of, or in conjunction with N,N-dimethyl-p-toluidine, suitable examples being N,N-dimethyl aniline, triethylamine, tri-n-butylamine and 2-diethylaminoethanol. The preferred system employs N,N-dimethyl-p-toluidine as the first accelerator moiety and saccharin (2, 3-benzisothiazolinone-1, 1-dioxide) as the complementary accelerator moiety.

The complementary accelerator moiety may comprise, in addition to, or in place of a sulphimide, a hydroperoxide, such as cumene hydroperoxide, or a peroxide, such as 2, 5-dimethyl - 2, 5-di(tertiary butyl peroxy) hexane or a monocyclic carbocyclic aromatic acid illustrative of which is benzoic acid. Also suitable is trichloroacetic acid and phenoxyacetic acid. Where a peroxide is employed, however, it is important that only peroxides which form substantially storage-stable compositions when mixed with the monomer should be employed. Suitable peroxides are those having half-lives in excess of 5 hours at 100° C., the half-life being defined as the time required to reduce by 50 percent the active oxygen content of a 5 mol percent solution of the peroxide in benzene at the specified temperature. Illustrative of the suitable peroxides of this type are, for example, the aforementioned 2, 5-dimethyl- 2, 5-di(tertiary butyl-peroxy) hexane and ditertiary butyl peroxide, dihexylene glycol peroxide, tertiary-butyl-cumyl peroxide, methyl isobutyl ketone peroxide and tertiary butyl peracetate.

The adhesive compositions in accordance with the invention may be readily prepared by stirring into the monomer the appropriate amount of the accelerator moiety until a homogeneous mixture is obtained. While the compositions containing the accelerator moiety and the complementary accelerator moiety respectively are comparatively stable while kept separate, it is nevertheless desirable, in view of the reactive nature of the monomer, to maintain both components under storage conditions where free access of air or oxygen is possible.

The amount of "accelerator moiety" to be added will of necessity vary with the nature of the particular monomer being employed and its effect on the storage life thereof. These proper proportions, however, can be readily determined. In general, the accelerator and complementary accelerator component moieties are used in a "synergistic amount." By "synergistic amount" is meant, that amount of each component which is sufficient to effect polymerization of the monomer under anaerobic conditions. The rate of polymerization will vary depending not only on the temperature but on the nature of the substrate to which the compositions are applied. We have found that from 1 to 10 parts by weight of accelerator moiety and from 1 to 10 parts by weight of complementary accelerator each, for every 100 parts by weight of monomer are satisfactory to achieve the above objectives. When the complementary accelerator contains a mixture of components, i.e., a peroxide or acid in addition to the sulphimide, the proportions used are such that the total of the components together add up to the above requirement for the complementary accelerator moiety. Amounts of accelerator moiety and complementary accelerator moiety in excess of 10 and 10 parts by weight respectively can be employed but it has been found to be both unnecessary and uneconomical.

For use it is merely necessary to apply one of the component compositions to one surface of the materials to be joined and to apply the second component composition either to the same or to a second surface to be bonded to the first. Where the two component compositions are applied to separate surfaces, the surfaces so treated may be stored for extended periods before being brought together. This embodiment of the invention therefore has considerable practical utility, since it enables large batches of items to be treated in one operation and stored prior to assembly. For example, nuts may be treated with one component composition and bolts with the complementary composition, both compositions remaining fluid for extended periods in the presence of oxygen and in the absence of each other. At the time of use, however, the act of screwing the nuts on to the threads of the bolts will serve the dual purpose of mixing the two components together and of excluding oxygen. Under these conditions the combined sealant composition will undergo rapid polymerization, so that a bond requiring high unwinding torque is quickly achieved.

The provision of the sealant composition as two separate complementary components enables a rapid-acting catalyst system to be employed, the components of which, by reason either of their nature or amount, could not be employed to produce a stable one-component sealant.

On the other hand, the present invention is distinguished from prior proposals to employ two-component compositions comprising a resin and a curing agent therefor in that both constituents of the instant invention contain a polymerizable monomer having anaerobic curing properties and either is thus capable of undergoing polymerization, albeit less rapidly, even in the absence of the complementary composition, when maintained under anaerobic conditions. In practice, the polymerization reaction is autocatalytic, and if initiated at one point, will rapidly spread throughout the mass. Inadequate mixing of the two components is, therefore, of far less importance with the compositions of the present invention than is the case, for example, with conventional resin/hardener systems.

It should be understood that either or both of the complementary compositions may additionally contain other materials conventially employed in adhesive compositions without departing from the scope of the invention. In particular, either or both compositions may contain fillers or thickening agents, such as polyvinyl acetate, polystyrene or other polymeric material soluble in the monomer, plasticizers to modify the strength of the bond obtained, and dyestuffs for ready identification of the component compositions.

The following examples, in which all parts are by weight, illustrate invention:

EXAMPLE 1

A solution, hereinafter referred to as "Solution A", was prepared by mixing

| | |
|---|---|
| Tetraethyleneglycol dimethacrylate | 90 parts |
| N,N-dimethyl-p-toluidine | 10 parts |

A second solution, hereinafter referred to as "Solution B," was prepared by mixing

| | |
|---|---|
| Tetraethyleneglycol dimethaecrylate | 99 parts |
| Saccharin | 1 part |

The two solutions, when stored separately, were found to be stable for an extended period and were substantially unchanged when examined after 6 months.

About 1 drop of Solution A was applied to the surface of a clean glass plate and a similar quantity of Solution B was applied to a second glass plate. The two treated surfaces were then brought into contact and within a few minutes had bonded firmly together.

A number of 5/16-inch BSF mild steel nuts and bolts were then similarly treated, Solution A being applied to the nuts and Solution B to the bolts.

After treatment a number of the nuts and bolts were assembled, allowed to stand at room temperature and were then tested at intervals. All were found to be finger-tight within 10 minutes and in 18 minutes had developed a resistance to unwinding of 125 inch pounds.

For comparison purposes a commercially available one-component anaerobic sealant stated to be fast-setting, was tested under identical conditions and was found to attain a value of 125 inch pounds only after standing for 2 ½ hours.

A number of the treated mild steel nuts and bolts in the unassembled condition were stored separately for 1 month in order to determine the stability of the solutions in the presence of a catalytic surface. After this time, the nuts were screwed onto the bolts and allowed to stand prior to testing. Measurements of the resistance to unwinding showed that the strengths developed in a given time were comparable with those of freshly applied solutions.

EXAMPLE 2

A solution was prepared by mixing

| Tetraethyleneglycol dimethacrylate | 90 parts |
| 2,5-dimethyl-2,5-di(tertiary butyl-peroxy)hexane | 10 parts | and this solution is hereinafter referred to as "Solution C."

Solution C was then employed to treat a number of 5/16-inch mild steel BSF bolts by applying 1 drop to the shank of each bolt. A corresponding nut, treated with Solution A as in Example 1, was then applied to the shank of each bolt so as to remain unseated and the assembly allowed to remain at room temperature.

Determination of the unwinding resistance at intervals showed that this system was slower than that of Example 1 but the resistance to unwinding had risen to 140 inch pounds after 4 hours at room temperature.

EXAMPLE 3

A composition comprising:

| Tetraethyleneglycol dimethacrylate | 98 parts |
| Ditertiary butyl peroxide | 1 part |
| Saccharin | 1 part | was prepared and found to have a storage life in excess of 5 months at room temperature. This composition was then applied to a clean glass plate and the plate pressed into contact with a second plate to which Solution A of Example 1 had been applied. After 15 minutes pressure was removed and the two plates were found to be firmly united.

EXAMPLE 4

Example 1 was repeated except that the tetraethyleneglycol dimethacrylate in Solutions A and B was replaced by pentaerythrityl tetrakis (dimethyleneglycol acrylate).

Both solutions of this Example were stable in the presence of air for at least 1 month at room temperature.

On testing with mild steel nuts and bolts similar results were obtained to those of Example 1.

EXAMPLE 5

The monomer of Solution B in Example 1 was replaced with an equal weight of N-methylmethacrylamide.

When employed in conjunction with Solution A of Example 1 on mild steel nuts and bolts as specified in Example 1, the combined composition set to give a finger-tight bond within 30 minutes and an unwinding resistance in excess of 100 inch pounds when tested after 6 hours.

EXAMPLE 6

The peroxide of Solution C (Example 2) was replaced with an equal weight of cumene hydroperoxide and similar results were obtained when the resultant composition was employed in conjunction with Solution A, as indicated in Example 2.

EXAMPLE 7

A solution comprising:

| Tetraethyleneglycol dimethacrylate | 97 parts |
| Benzoic acid | 3 parts | was prepared and found to be stable for an extended period in the presence of air at room temperature.

A few drops of this solution were then applied to the shanks of 5/16 inch BSF mild steel bolts. Corresponding nuts treated with Solution A were screwed on to the shanks and the assembled units allowed to stand at room temperature prior to testing.

After 6 hours, the unwinding force required was in excess of 50 inch pounds.

I claim:

1. A method for producing a rapid and effective bond between two surfaces which comprises applying to a first surface to be bonded a composition which is stable for an extended period in the presence of oxygen and comprises a major proportion of a monomer having anaerobic curing properties and a minor proportion of a first accelerator moiety, separately applying to a second surface to be bonded, or to the first surface immediately before bonding, a second composition, also stable for an extended period in the presence of oxygen and comprising a major proportion of a monomer having anaerobic curing properties and a minor proportion of a second accelerator moiety complementary to the first and bringing the first and second surfaces together to allow the said compositions to combine anaerobically, said monomers being selected from the group consisting of compounds of the formula $$H_2C=C(R^I)-C(O)-O-[(CH_2)_x-(C(H/R^{II})-C(R/H))_n-O]_y-C(O)-C(R^I)=CH_2 \quad (I)$$

$$\{H_2C=C(R^I)-C(O)-O-[(CH_2)_{x1}-(C(R^I/R^{II}))_n-O]_y\}_z-Q \quad (II)$$

$$CH_2-C(R^I)-C(O)-N(R^{III})(R^{III}) \quad (III)$$

and mixtures thereof wherein R is $-H$, $-CH_3$, $-C_2H_5$, $-CH_2-OH$, or $$CH_2-O-C(O)-C(R^I)=CH_2;$$

$R^I$ is $-H$, $-Cl$, $-CH_3$, or $-C_1H_5$;
$R^{II}$ is $-H$, $-OH$, or $$-O-C(O)-C(R^I)=CH_2;$$

$R^{III}$ is $-H$, $-CH_3$ or $C_2H_5$;
$x$ and $y$ are integers having a value of from 1 to 4
$n$ is 0 or 1;
$x^1$ is an integer having a value of from 0 to 4
$z$ is 1, 2, 3 or 4
Q is an organic radical having a valence of $z$, said organic radical being a hydrocarbon residue of one to eight carbon atoms said first accelerator moiety being a tertiary amine, said second complementary accelerator moiety being selected from the group consisting of a sulphimide, a peroxide, a monocyclic carbocyclic aromatic acid, trichloroacetic acid, phenoxyacetic acid and mixtures thereof, the accelerator moieties in the compositions being used in an amount so that they act synergistically when combined.

2. The method of claim 1, wherein the first accelerator moiety and the second complementary accelerator moiety are each employed in an amount from 1 – 10 parts by weight for each 100 parts by weight of monomer.

3. The method of claim 2, wherein the peroxide has a half-life in excess of 5 hours at 100° C.

4. The method of claim 2, wherein the monomer has the general formula I and at least one of the surfaces to be bonded is non-metallic.

5. The method of claim 4, wherein the monomer is tetraethyleneglycol dimethylacrylate.

6. The method of claim 2, wherein the monomer has the general formula II and at least one of the surfaces to be bonded is non-metallic.

7. The method according to claim 6, wherein the monomer is a monoacrylate ester of dimethyleneglycol monomethylether.

8. The method of claim 2, wherein the first accelerator moiety is N,N-dimethyl-p-toluidine, N,N-dimethyl aniline, triethylamine, tri-n-butylamine or 2-diethylaminoethanol.

9. The method of claim 2, wherein the complementary accelerator moiety is saccharin.

10. The method of claim 1, wherein the surfaces to be bonded are a nut and a bolt.

11. The method of claim 1, wherein the monomer is N-methyl methacrylamide.

12. The method of claim 1, wherein the complementary accelerator moiety is benzoic acid.

13. The method according to claim 6, wherein the monomer is pentaerythrityl tetrakis (dimethylene glycol acrylate).

* * * * *